United States Patent
Quinn et al.

(10) Patent No.: US 8,180,489 B2
(45) Date of Patent: May 15, 2012

(54) COMMUNICATION SYSTEM FOR A WATER SOFTENER SYSTEM

(75) Inventors: Kerry Quinn, Palatine, IL (US); Kumudika Premathilake, Schaumburg, IL (US)

(73) Assignee: Culligan International Company, Rosemont, IL (US)

( * ) Notice: Subject to any disclaimer, the term of this patent is extended or adjusted under 35 U.S.C. 154(b) by 290 days.

(21) Appl. No.: 12/238,786

(22) Filed: Sep. 26, 2008

(65) Prior Publication Data

US 2009/0090674 A1    Apr. 9, 2009

Related U.S. Application Data

(60) Provisional application No. 60/977,740, filed on Oct. 5, 2007.

(51) Int. Cl.
*C02F 5/00* (2006.01)
(52) U.S. Cl. ......... 700/266; 700/9; 700/65; 702/188; 340/612; 340/618; 340/500; 73/290 R
(58) Field of Classification Search .......... 700/266, 700/65, 9; 702/188; 340/612, 618, 500; 73/290 R; 709/224
See application file for complete search history.

(56) References Cited

U.S. PATENT DOCUMENTS

| | | | |
|---|---|---|---|
| 3,567,864 A | 3/1971 | Palmer et al. | |
| 3,807,425 A | 4/1974 | Boirum et al. | |
| 3,872,004 A | 3/1975 | Grout et al. | |
| 4,275,448 A * | 6/1981 | Le Dall | 700/271 |
| 4,987,409 A * | 1/1991 | Jackson | 340/623 |
| 5,058,032 A | 10/1991 | Farrell et al. | |
| 5,335,267 A | 8/1994 | Evers et al. | |
| 6,051,144 A | 4/2000 | Clack et al. | |
| 6,444,127 B1 | 9/2002 | Vaughan et al. | |
| 6,456,202 B2 | 9/2002 | Johannsen et al. | |
| 6,596,159 B1 | 7/2003 | Maruyama et al. | |
| 6,657,546 B2 | 12/2003 | Navarro et al. | |
| 6,696,966 B2 | 2/2004 | Bearak | |
| 6,764,019 B1 | 7/2004 | Kayahara et al. | |
| 6,785,724 B1 | 8/2004 | Drainville et al. | |
| 6,812,848 B2 | 11/2004 | Candela | |
| 6,814,872 B2 | 11/2004 | Rawson | |
| 6,826,267 B2 | 11/2004 | Daum et al. | |
| 6,954,701 B2 * | 10/2005 | Wolfe | 702/22 |
| 6,958,693 B2 | 10/2005 | Rothgeb et al. | |
| 7,030,768 B2 * | 4/2006 | Wanie | 340/618 |
| 7,100,427 B2 | 9/2006 | Kahn et al. | |

(Continued)

FOREIGN PATENT DOCUMENTS

JP    2003-136057    5/2003

OTHER PUBLICATIONS

Translation for JP-2003136057 cited in IDS.*

*Primary Examiner* — Brian R Gordon
*Assistant Examiner* — Shogo Sasaki
(74) *Attorney, Agent, or Firm* — Greer, Burns & Crain, Ltd.

(57) ABSTRACT

A communication system for a water softener system that includes a controller configured for communicating with the water softener assembly and a remote display configured for sending and receiving at least one signal to and from the controller to a remote location.

6 Claims, 2 Drawing Sheets

U.S. PATENT DOCUMENTS

| | | |
|---|---|---|
| 7,104,115 B2 | 9/2006 | Kahn et al. |
| 7,249,000 B2 | 7/2007 | Kahn et al. |
| 7,290,502 B2 * | 11/2007 | Kidd et al. ............... 122/14.2 |
| 2002/0017495 A1 | 2/2002 | Iizuka et al. |
| 2005/0251366 A1 | 11/2005 | Kahn et al. |
| 2005/0258961 A1 | 11/2005 | Kimball et al. |
| 2006/0020427 A1 | 1/2006 | Kahn et al. |
| 2006/0071774 A1 | 4/2006 | Brown et al. |
| 2006/0174846 A1 * | 8/2006 | Kidd et al. ............... 122/446 |
| 2007/0050157 A1 | 3/2007 | Kahn et al. |
| 2007/0063866 A1 | 3/2007 | Webb |
| 2007/0119758 A1 | 5/2007 | Duplessis et al. |
| 2007/0119759 A1 | 5/2007 | Duplessis et al. |
| 2007/0120736 A1 | 5/2007 | MacKenzie et al. |
| 2007/0214872 A1 | 9/2007 | Ammann et al. |
| 2007/0219728 A1 | 9/2007 | Papageorgiou et al. |

* cited by examiner

COMMUNICATION SYSTEM FOR A WATER SOFTENER SYSTEM

PRIORITY CLAIM

This application claims priority to and the benefit of U.S. Provisional Application No. 60/977,740 filed on Oct. 5, 2007.

BACKGROUND OF THE INVENTION

The present invention relates generally to fluid treatment systems such as water treatment systems including water softeners, and more particularly to a communication system for a water softener system. It is recognized that many aspects of the present invention can be applied to other types of fluid treatment systems, such as filtering or de-ionizing systems.

Water softeners are well known in the art and typically include a raw water source, a treatment tank containing an ion exchange resin, a brine tank containing a brine solution, and a control valve for directing fluids between the source, the tanks and a drain or other output.

Water softening occurs by running water through the ion exchange resin, which replaces the calcium and magnesium cations in the water with sodium cations. As the ion exchange process continues, the resin eventually loses its capacity to soften water and must be replenished with sodium cations. The process by which the calcium and magnesium ions are removed, the capacity of the ion exchange resin to soften water is restored, and the sodium ions are replenished is known as regeneration.

During regeneration, brine, a concentrated or saturated salt solution, is passed through the ion exchange resin and the cations in the resin are replaced with sodium ions. Regeneration is a multi-step process incorporating a number of cycles, specifically, backwash, brine draw, rinse and refill cycles.

Current water softener systems typically include a control valve that controls the water flow between the raw water inlets, the various inlets and outlets of the conditioning tank and the brine tank, the outlet for supplying water to the residence or commercial structure, and the drain. As the control valve operates, the water softener cycles through the service, backwash, brine draw, rinse, refill and bypass stages. The progress of the water softener is often displayed on a controller attached to the softener, but typically is not remotely communicated. Accordingly, if the user is not near the water softener, they are not aware of its operation or whether such operation is functioning properly.

Water softener systems also generally include tank-mounted sensors that monitor the system during operation and communicate salt level or flow rate data, for example, to the controller. If the sensors determine that the system is not operating properly (i.e., the salt level is low or flow rates are reduced), appropriate signals are sent to the controller. The controller then emits an audible or visible signal, indicating to the user that service must be provided.

However, such signals are generally only sent to the controller, which is typically directly attached to the water softener system. Accordingly, if the user is away from the system when the error is recognized, the alarm may not be noted, and the problem may not be timely fixed. Such a delay in service can cause permanent damage to the water softener and reduce the softening capability of the system.

Although water softener systems have been developed that can remotely communicate data from the water softener, they typically require manual action by the user, such as inputting data regarding salt level, or manually placing a phone receiver to a speaker that can send data to a remote location via a modem connection. Further, current water systems that are configured for providing wireless or remote communication capabilities between the water softener and a remote location are typically configured for send-only transmissions, and can generally only send one type of data to the location (i.e., that the salt level is low).

BRIEF SUMMARY

The present communication system for a water softener assembly remotely communicates with the user and/or service provider by sending diagnostic information regarding the softener. Further, the present system provides both wireless and wired communication between the softener and a remote display to suit the needs of the user or consumer. Also, the present communication system is configured for both sending and receiving information.

Specifically, the present communication system includes a controller configured for communicating with the water softener assembly and a remote display configured for sending and receiving at least one signal to and from the controller to a remote location.

Another embodiment of the present communication system includes a water softener assembly and a controller configured for communicating with the water softener assembly and a service provider for automatically transmitting a condition of the water softener system to the service provider.

Another embodiment provides a method of communicating information about a water softener system including providing a water softener assembly, providing a controller configured for communicating with the water softener assembly and a service provider and automatically communicating with a network of the service provider for transmitting information to the network related to the water softener system.

DETAILED DESCRIPTION

Figure 1:
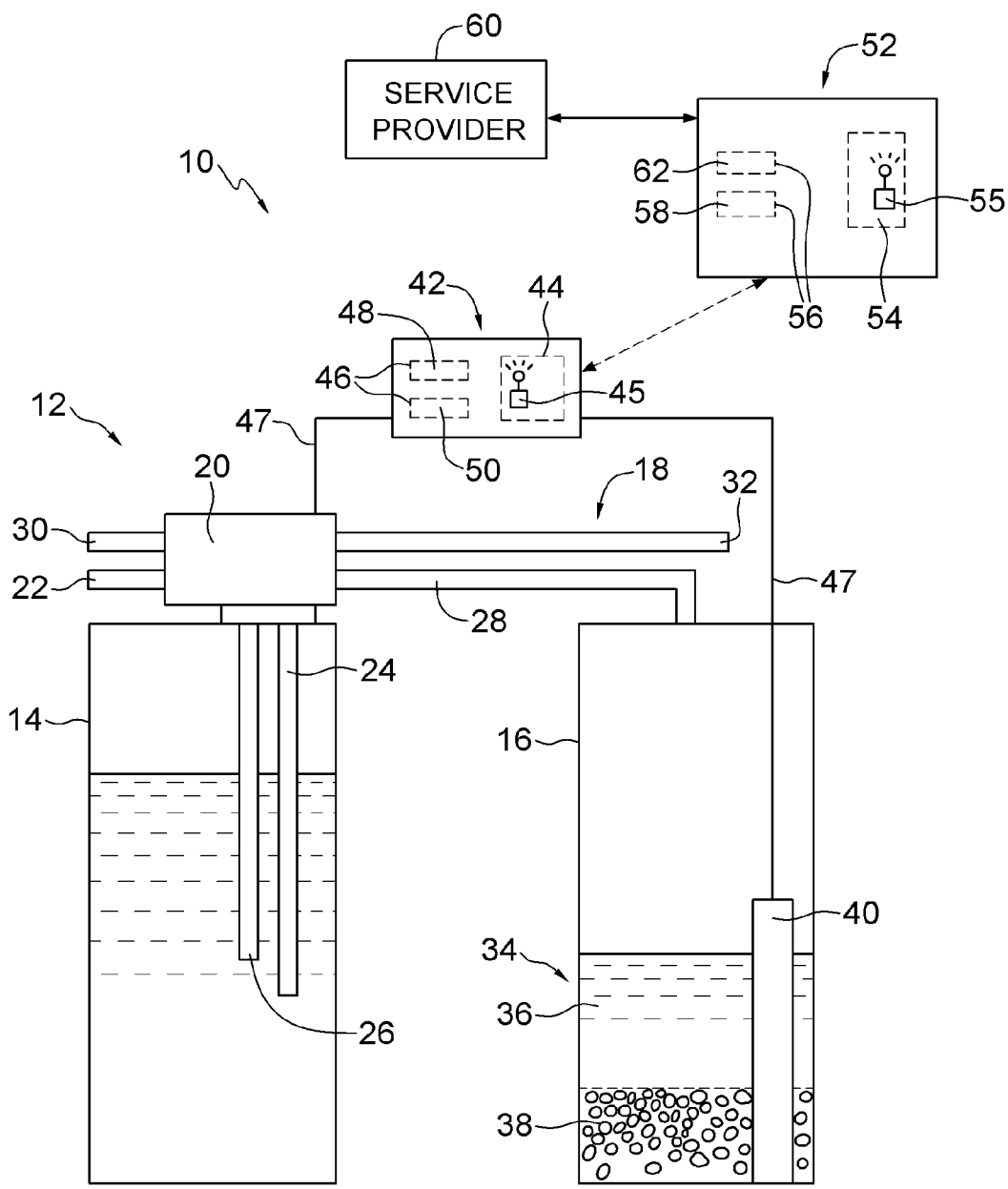
FIG. 1 is a schematic diagram of a water softener system utilizing the present communication system.

Referring to FIG. 1, the present communication system is generally designated 10 and is configured for use with a water softener assembly 12, which includes a treatment tank 14 connected to a brine tank 16 by piping 18. A valve assembly 20 is removably attached to the treatment tank 14 and is configured for controlling the water flow between a raw water inlet 22, a treatment tank inlet 24 and outlet 26, and a brine tank inlet/outlet 28, a bypass outlet 30 for supplying water to the residence or commercial structure, and a drain 32.

The brine tank 16 is filled with a brine solution 34 including water 36 and salt granules 38, as known in the art. The brine tank 16 further includes a sensor assembly 40 for measuring, for example, the amount of salt in the brine tank, the concentration of the brine solution, the flow rates of the raw water entering the brine tank and the brine solution exiting the brine tank, and the level of water in the brine tank.

Specifically, the sensor assembly 40 includes a probe (not shown) constructed and arranged for measuring the salt level within the brine tank 16, which is described in detail in U.S. Pat. No. 6,696,966, entitled AUTOMATIC SALT LEVEL MONITOR FOR A WATER DEVICE, herein incorporated by reference. The sensor assembly 40 also includes at least one and preferably a pair of detector and ball assemblies for sensing the salinity of the brine solution, and the flow rates of the water and brine entering and exiting the brine tank, respectively, which are fully described in U.S. Application Ser. No. 60/966,368, entitled SALOMETER AND FLOW RATE SENSOR ASSEMBLY, filed Aug. 27, 2007, also herein incorporated by reference. However, it is recognized that other types of sensors or measurement devices may be appropriate to suit the application.

The communication system 10 is also configured for communicating with the valve assembly 20, which includes a piston assembly driven by a series of cams/gears (not shown). Specifically, the valve assembly 20 transmits data to the communication system 10 regarding the position of the water softening cycle (i.e., whether the softener 12 is in the service, backwash, brine draw, rinse, refill or bypass cycle). The valve assembly 20 is fully described in commonly owned and copending U.S. Application Ser. No. 60/997,317 entitled CONTROL VALVE FOR A FLUID TREATMENT SYSTEM, filed Oct. 2, 2007 and herein incorporated by reference.

Figure 2:
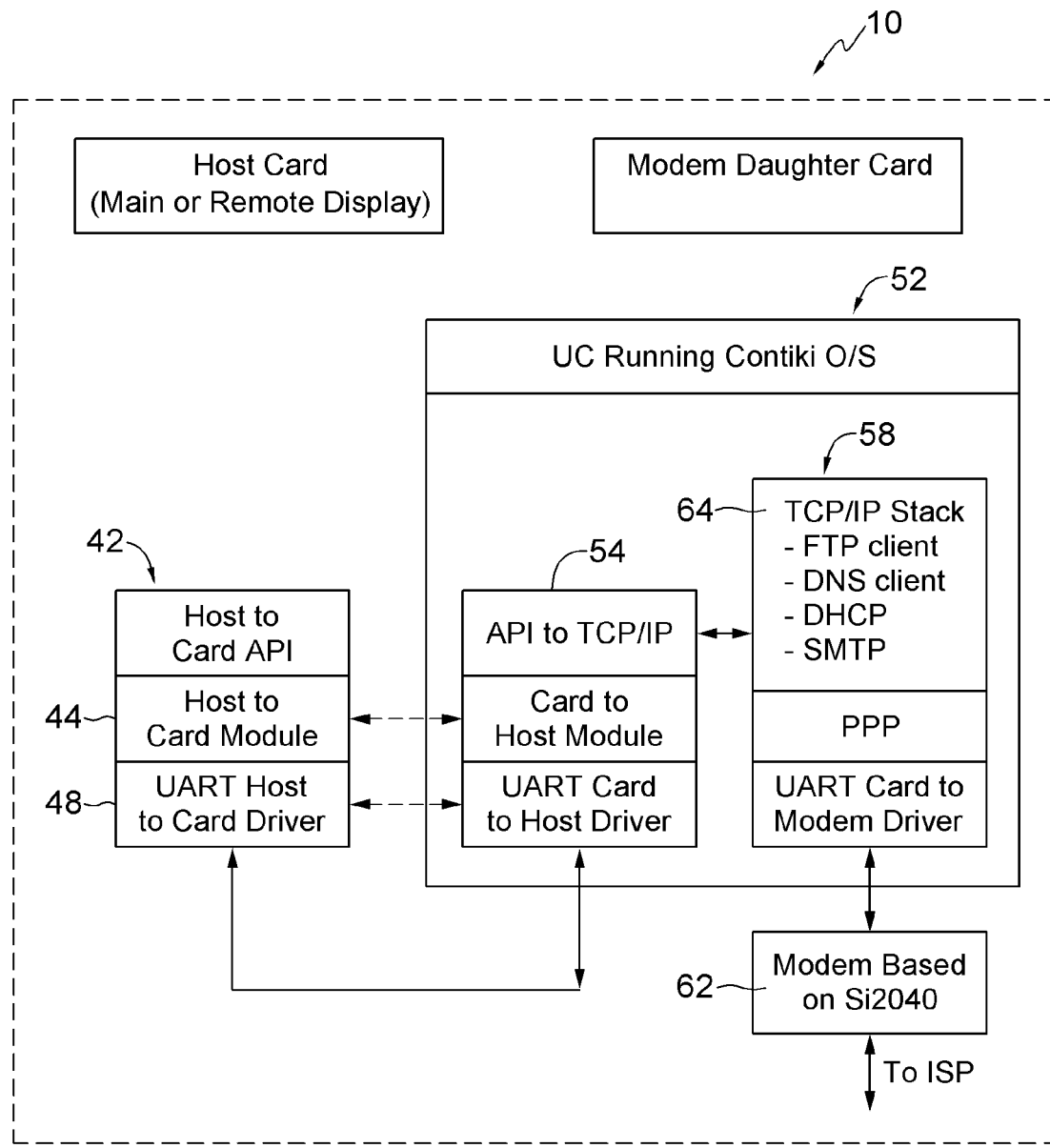
FIG. 2 is a schematic diagram showing the operation of the present communication system.

Referring now to FIGS. 1 and 2, a controller 42 is attached to the water softener assembly 12 and includes a primary circuit board 44 having a radio transmitter 45 and at least one and preferably a pair of slots 46 configured for receiving a secondary circuit board 48 and an optional modem card 50 (FIG. 1), respectively. The valve assembly 20 and the sensor assembly 40 are connected to the controller 42 and specifically the primary circuit board 44 by cables 47 or the like. It is also contemplated that the valve assembly 20 and the sensor assembly 40 could be configured for wirelessly communicating with the controller 42.

To enable a consumer to receive data at a location remote from the controller 42, the communication system 10 includes a remote display 52 having a main circuit board 54 with a radio transmitter 55 and at least one slot 56 for receiving a minor circuit board 58 and an additional plug-in component, if necessary. The controller 42 is configured for communicating with the remote display 52. Specifically, the valve and sensor assemblies 20, 40 transmit data to the primary circuit board 44 by wireless circuitry. When utilizing wireless circuitry, the data is sent from the secondary circuit board 48 via the radio transmitters 45, 55 to the minor circuit board 58, where it is translated from a string of coded numbers/letters to a readable format and sent to the remote display 52.

The communication system 10 is configured for operating in accordance with the schematic shown in FIG. 2. Approximately every ten seconds, the primary circuit board 44 transmits "err state" information to the remote display 52 in one of the manners described above. Specifically, the "err state" information preferably includes the time and error conditions (i.e., "no error" or "error"). The information is transmitted to the minor circuit board 58 in coded strings via wireless or modem communication that are translated and displayed on the remote display 52.

Status information is also sent to the remote display 52 when the water softener 12 changes cycles. Specifically, the valve assembly 20 is in constant communication with the controller 42, such that when the softener 12 changes cycle, a signal is sent from the valve assembly to the controller via the primary circuit board 44. This signal is then communicated from the secondary circuit board 48 to the main circuit board 54 via the radio transmitter. When the signal is received by the main circuit board 54, it is translated and the remote display 52 will indicate on its screen that the softener 12 is in "bypass" or "brine draw," for example. This data can also be communicated to the service provider, which will be described below.

At a timed interval, preferably approximately every sixty seconds, the controller 42 sends status information to the remote display 52, such as the current flow rate or salt concentration data received from the sensor assembly 40. After the data is sent to the remote display 52, the controller 42 waits a predetermined period, such as approximately thirty seconds for an acknowledgement from the remote display that the data was received. If the thirty seconds expires without an acknowledgement, the controller 42 displays a "problem found" or similar error code, and continues to send the error and status messages until acknowledgement is received. When acknowledgement is received, the "problem found" display is cleared. If acknowledgement is not received, the controller 42 emits a signal alerting the user that service is necessary. However, it is recognized that other methods of acknowledgement and error may be appropriate.

The present communication system 10 also enables the data to be sent from the water softener assembly 12 to a service provider network 60. Specifically, the minor circuit board 58 includes a second modem card 62, which translates the data received from the controller 42 into an email message, sends it to the service provider via telephone and logs into the service provider network 60 to display the message in readable format. Accordingly, if the softener 12 is malfunctioning, the service provider is alerted to the error and schedules an appointment for servicing the softener. The controller 42 also optionally directly communicates with the service provider network 60 by sending a signal from the primary circuit board 44 to the modem 50, which connects to the service provider network 60, logs in and displays the message as an email.

In addition to receiving information from the controller 42, the remote display 52 is also configured for sending commands to the controller. Specifically, if the user wishes to place the water softener 12 in regeneration mode, a button or other control device (not shown) is actuated on the remote display 52, which sends the command from the minor circuit board 58 to the secondary circuit board 48 via the radio transmitter, where it is received by the primary circuit board 44. If the controller 42 does not acknowledge receipt of the command after a predetermined amount of time, an error message will appear on the remote display 52, indicating that wireless communication has been lost. When the command is received in the controller 42, a signal is sent to the valve assembly 20 to initiate regeneration. It is contemplated that other commands can also be sent to the controller 42, such as a bypass command that enables a consumer to use untreated water, or a shutdown command, for example.

The present communication system is also configured for automatically communicating with the service provider to ensure that the system is properly updated. Specifically, the controller 42 can communicate with the service provider by modem communication initiated by either the controller or the remote display 52, as described above, and log itself into the service provider's network 60. While on the network 60, it can be determined whether the time on the controller 42 is consistent with the current time on the network, ensuring proper operation, and whether the current controller includes the most updated software version for the softener assembly 12. If the time of day on the controller 42 is not consistent with that of the service provider network, the minor circuit board 58 downloads the updated time and communicates the current time to the controller 42 through the secondary and primary circuit boards 48, 44, respectively, either via radio transmitter or modem communication, as described above. Similarly, if the controller 42 does not have updated software, it can be downloaded from the network 60 via a TCP/IP protocol 64 provided in the minor circuit board 58 and sent to the controller 42 as described above.

The present communication system 10 enables both wireless and wired communication between the softener 12 and a remote display 52 provided in a separate location in the user's house. Also, the present system 10 enables communication between the controller 42, remote display 52 and/or the service provider network 60, easily alerting the provider when the softener needs servicing or is operating properly. Further, the system 10 is configured for both sending and receiving signals. Specifically, in addition to sending data and signals to the remote display and the service provider, the controller 42 is configured for being commanded to enter into regeneration or bypass modes from the remote display, and also for downloading updated software from the service provider network.

While a particular embodiment of the present communication system for a water softener system has been described herein, it will be appreciated by those skilled in the art that changes and modifications may be made thereto without departing from the invention in its broader aspects.

What is claimed is:

1. A communication system for a water softener system, comprising:
   a water softener assembly;
   a controller at a first location, said controller configured for communicating with said water softener assembly;
   a remote display at a second location, said remote display configured for communicating with said controller and enabling a user to receive data from said controller, wherein said first location is different from said second location; and
   a service provider at a third location configured for communicating with said controller or said remote display via an interne connection,
   said controller or said remote display automatically transmitting a condition of said water softener assembly to the service provider and said controller configured to download updated software from said service provider.

2. The communication system of claim 1, wherein transmitting the condition of said water softener assembly includes sending an e-mail including the condition to the service provider.

3. A method of communicating information about a water softener system, comprising:
   providing a water softener assembly;
   providing a controller at a first location configured for communicating with the water softener assembly;
   providing a remote display at a second location configured for communicating with said controller, said remote display enabling a user to receive data from said controller, wherein said first location is different from said second location;
   providing a service provider at a third location in communication with said controller or said remote display, said service provider enabling communication over an internet network between said controller or said remote display, and said service provider;
   automatically sending error messages on an operating condition of the water softener assembly via said internet network to said remote display;
   controlling the water softener assembly using said internet network for transmitting control commands from the remote display to the water softener assembly;
   determining whether a current software version utilized by said controller is an updated software version; and
   automatically downloading the updated software version to said controller from said service provider when the current software version is not the updated software version.

4. The method of claim 3, further including:
   determining whether a time on said controller is consistent with a current time of the network;
   downloading an updated time when the time of said controller is not consistent with the current time of the network; and
   communicating the current time to said controller.

5. The method of claim 3, further including automatically communicating a condition of said water softener assembly to said internet network.

6. The method of claim 3, further including emitting a signal from said controller to said interne network alerting the service provider that service on said water softener assembly is necessary when a malfunction occurs in the water softener system.

* * * * *

(12) INTER PARTES REVIEW CERTIFICATE (46th)
United States Patent                                    (10) Number:     US 8,180,489 K1
Quinn et al.                                            (45) Certificate Issued:   Nov. 25, 2014

(54) COMMUNICATION SYSTEM FOR A WATER SOFTENER SYSTEM

(75) Inventors: Kerry Quinn; Kumudika Premathilake

(73) Assignee: CIT Finance LLC

Trial Number:

IPR2013-00155 filed Feb. 21, 2013

Petitioners: Ecowater Systems LLC; Marmon Water LLC; Marmon Holdings, Inc.; Berkshire Hathaway Inc.

Patent Owner: Culligan International Company

Inter Partes Review Certificate for:

Patent No.:  8,180,489
Issued:      May 15, 2012
Appl. No.:   12/238,786
Filed:       Sep. 26, 2008

The results of IPR2013-00155 are reflected in this inter partes review certificate under 35 U.S.C. 318(b).

INTER PARTES REVIEW CERTIFICATE
U.S. Patent 8,180,489 K1
Trial No. IPR2013-00155
Certificate Issued Nov. 25, 2014

AS A RESULT OF THE INTER PARTES REVIEW PROCEEDING, IT HAS BEEN DETERMINED THAT:

Claims 1-6 are cancelled.

\* \* \* \* \*